Oct. 10, 1961     H. M. DODGE     3,003,576
AUTOMOBILE FLOOR MAT

Filed May 27, 1957     2 Sheets-Sheet 1

INVENTOR
*Howard M. Dodge*

BY *McCoy, Greene & LeGrotenhuis*
ATTORNEYS

Oct. 10, 1961　　　H. M. DODGE　　　3,003,576
AUTOMOBILE FLOOR MAT
Filed May 27, 1957　　　2 Sheets-Sheet 2
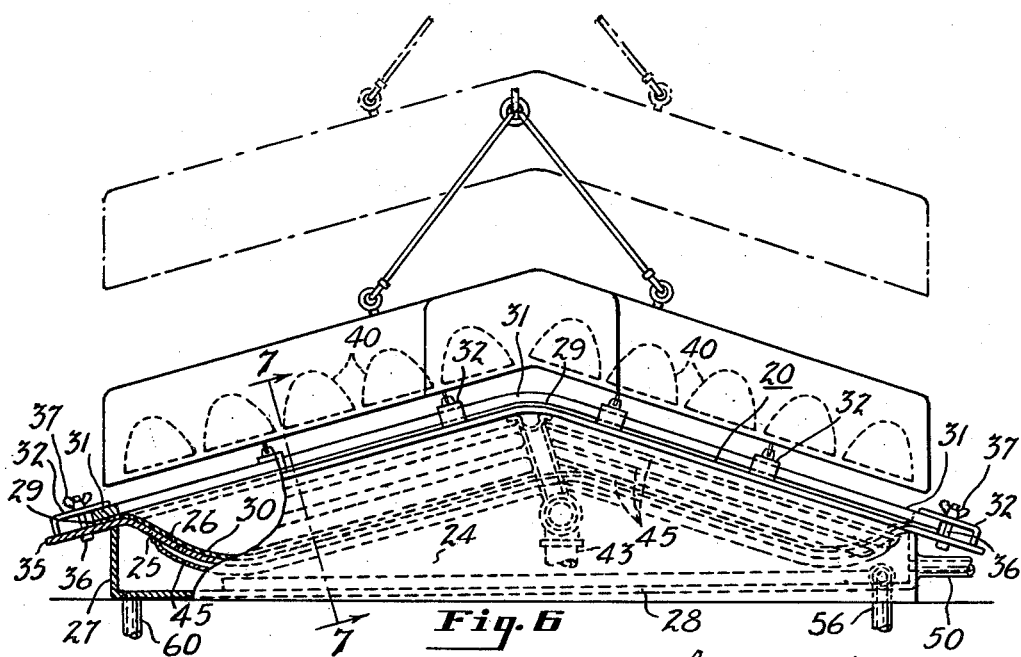
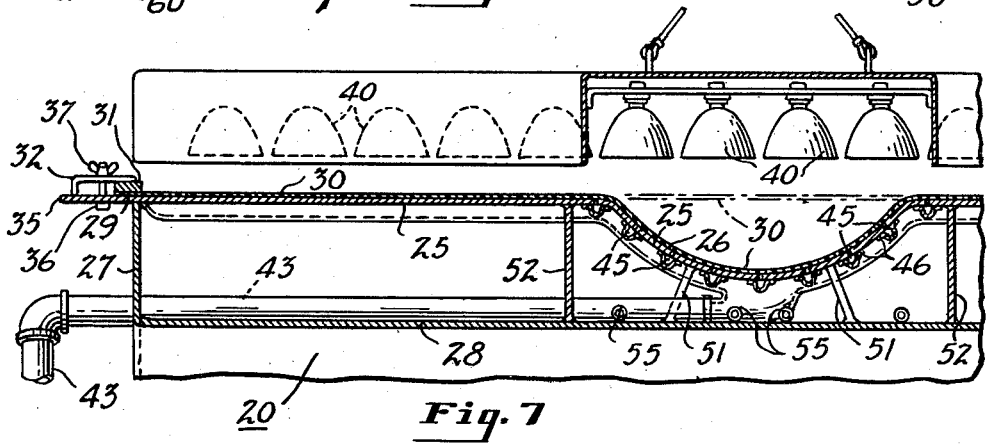
INVENTOR
*Howard M. Dodge*
BY McCoy, Greene + LeGrotenhuis
ATTORNEYS 3,003,576
AUTOMOBILE FLOOR MAT
Howard M. Dodge, Marion, Ind., assignor to The General Tire & Rubber Company, Akron, Ohio, a corporation of Ohio
Filed May 27, 1957, Ser. No. 661,915
3 Claims. (Cl. 180—90.6)

This invention relates to flexible laminated plastic articles useful for floor mats or the like and, more particularly, to automobile floor mats formed from a thermoplastic base layer of a plasticized polyvinyl base composition which can be formed into a permanent shape by a molding method such as vacuum-forming.

In the past, floor mats for vehicles have been generally made by placing rubber stock in a hot mold of a definite contour and curing the rubber by heat and pressure. The rubber mat was then used with a jute mat placed between it and the floor boards. One disadvantage in using such a floor mat is the fact that its cushioning and sound-deadening properties are not completely satisfactory. Also since the jute is exposed near the edges of the mat water is frequently absorbed and entrapped on the floor boards and to cause rusting thereof. Another limitation inherent in a rubber mat is the fact that it is expensive and difficult to satisfactorily match the color of rubber mats with that of the interior of the automobile. Also, it is difficult to clean the mat.

Mats of plasticized polyvinyl chloride have also been proposed because of their ease of cleaning and bright colors. However, since such materials do not cure, difficulty has been had in making and holding the contours required in a modern automobile. Vacuum forming, wherein a heated sheet of polyvinyl chloride is pulled by vacuum against a cold metal form as a method of forming floor mats, would be desirable from the standpoint of a fast, economical process. However, while this process has been successful in the case of rigid thermoplastic materials it has not been successful in the case of flexible thermoplastics, which are plasticized to a flexible state as is desirable for use in floor mats. Such materials tend to retract to their original shape upon cooling from their heat-softened state.

It is an object of the present invention to provide a method of making a low cost floor mat with improved cushioning and sound deadening properties and with means for eliminating absorption of moisture on the floor boards and particularly near the side edges and pedal openings so as to prevent rusting out of the floor boards.

It is still a further object of the present invention to provide an automobile floor mat that holds molded contour, is easily cleaned and matches the interior of the car.

Other objects, uses and advantages of the present invention will become apparent to those skilled in the art from the following description and claims and from the drawings in which:

FIGURE 6 is fragmentary elevatoinal view of a vacuum forming mold suitable for use in the present invention with parts broken away and shown in cross section; and FIGURE 7 is a fragmentary elevational view taken on the line indicated at 7—7 in FIG. 6.

The present invention makes use of a plurality of layers of thermoplastic material joined together by heat sealing so that each layer tends to change the creep properties of each other layer so as to hold desired contour. The laminated floor mat comprising (a) a relatively thick plastic base layer, (b) a central spongy polyurethane layer and (c) a relatively thin top layer of a plasticized polyvinyl base composition. The composite floor mat is heat sealed at side edges and pedal openings and adapted to conform to the shape of the floor of a vehicle.

The mat is generally shaped by forcing components of the mat into the desired contour and maintaining them in the desired contour while in the heat softened condition until they reach substantially complete stress relief and then cooling them. Thus the composite thermoplastic article (or each layer separately) may be heated with heating means such as a radiant heating panel to a temperature in the vicinity of, but below the melting point of the thermoplastic. The hot article may then be conformed by vacuum or other pressure against a mold surface while the article is still at the above described temperature and before substantial cooling takes place. It is then maintained at this temperature until it has lost its tendency to shrink back to its unformed shape; it is then cooled in the mold and removed from the mold to provide a permanently formed floor mat.

Figure 1:
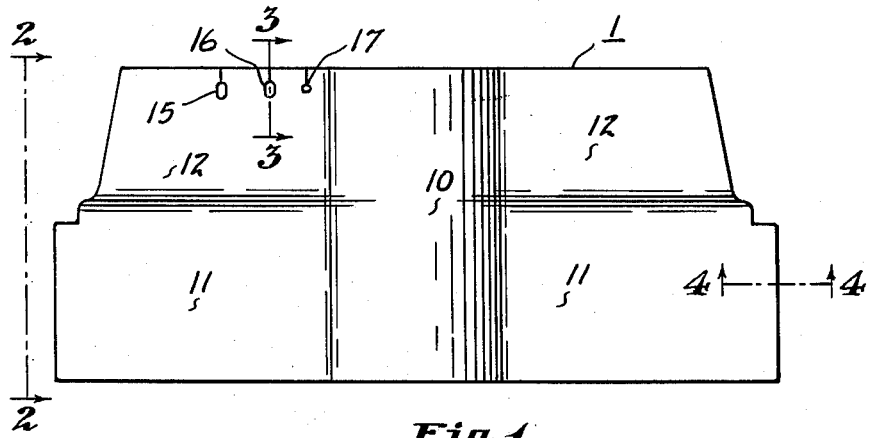
FIGURE 1 is a plan view of an automobile floor mat made in accordance with the present invention.
Figure 2:
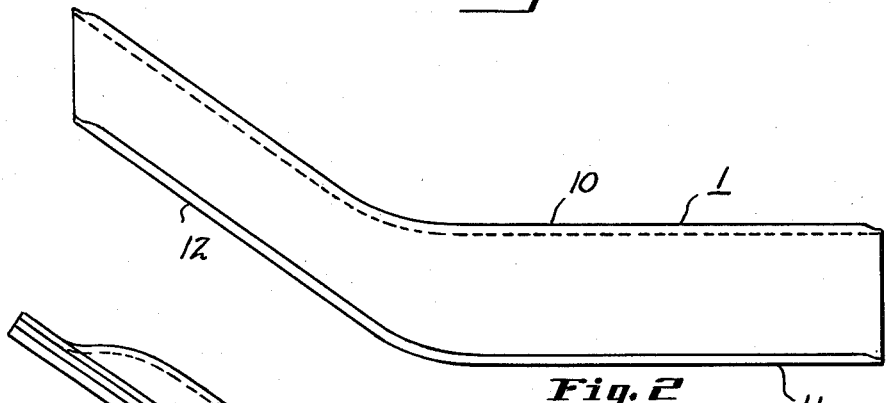
FIGURE 2 is a side elevational view of the floor mat and on an enlarged scale.
Figure 3:
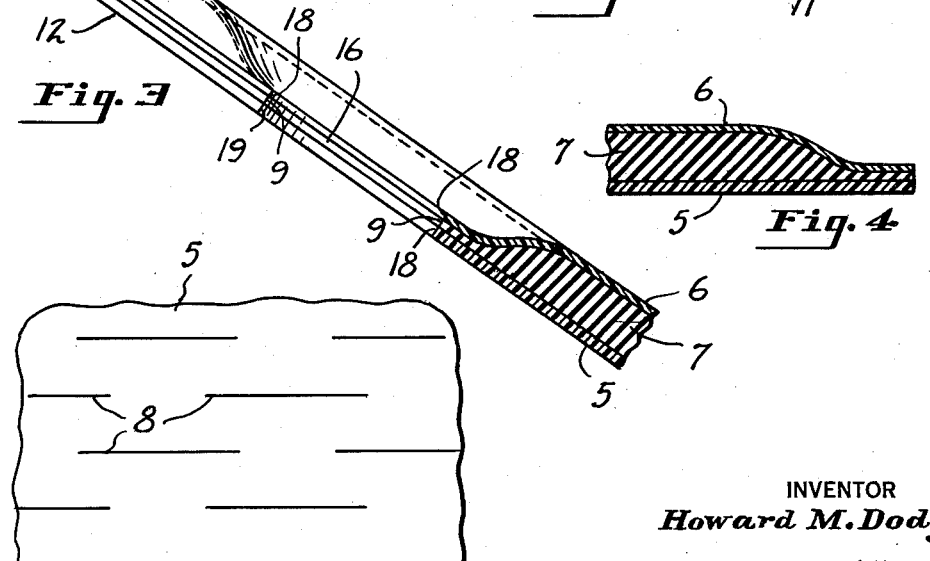
FIGURE 3 is a fragmentary side elevational view with parts broken away and shown in section taken on the line indicated at 3—3 in FIG. 1 and on an enlarged scale.
Figure 4:
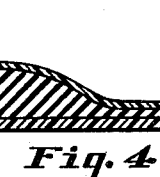
FIGURE 4 is a fragmentary sectional side elevational view taken on the line indicated at 4—4 in FIG. 1 and on an enlarged scale.
Figure 5:
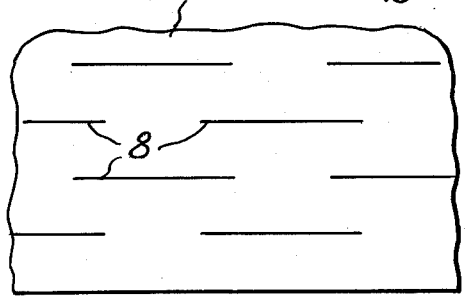
FIGURE 5 is a fragmentary plan view of a portion of the floor mat showing sound deadening construction.

Referring more particularly to the drawings, FIGS. 1 and 2 show an automobile floor mat 1, which as best illustrated by FIG. 3 or 4, comprises a relatively thick plastic base layer 5, a relatively thin plastic top layer 6 and an intermediate central spongy cellular layer 7 interposed between them so as to provide the mat with excellent cushioning and sound-deadening properties.

The plastic base layer 5 is preferably relatively thick dead, slightly stretchable, polyvinyl halide (preferably chloride) base composition comprising a highly cross linked rubbery material such as a highly cross linked polyurethane or a highly cross linked nitrile rubber. The cross linking should be sufficient to render the polyurethane and nitrile rubber nonplastic so it resembles a vulcanized rubber and therefore tends to give the low flow but flexible properties of vulcanized rubber to the composition. The rubbery component of the base layer should however be a material which, in the non-cross linked state, is a plasticizer for the polyvinyl chloride, i.e. it is compatible therewith. Examples of such are nitrile rubbers of the Buna N type, copolymers of methyl isopropenol ketone and butadiene and rubbery polyester and polyether urethanes. The basic resin of the base layer may be polyvinyl chloride, polyvinylidene chloride, a vinyl chloride-vinyl acetate copolymer, a vinyl chloride-vinylidene chloride copolymer or mixtures of any one or more thereof. The preferred plasticizer and deadening agent for the base layer 5 is a substantial proportion of rubbery cross linked polyurethane such as that obtained from a dense crust of polyurethane that generally forms when preparing a cellular polyurethane as hereinafter described. This material or equivalent cross linked rubbery material having compatibility producing groups is used in sufficient proportion to give the base layer a dead but flexible feel. Other plasticizing ingredients such as dioctyl phthalate, tricresyl phosphate and similar high backing esters as well as polymeric plasticizers such as polyesters of polybasic acids and polycarboxylic acids may as is well known in the art be used with the cross linked rubbery polyurethanes, nitrile rubbers, etc. Pigments, stabilizers and additional ingredients may as is well known in vinyl resin art be added to the composition.

The base layer 5 as above noted should be slightly stretchable of a dead nature to hold contour and also to dampen vibration. A plurality of slits or cuts 8 which are spaced apart in a staggered relationship and which have a length several times their width are also preferably provided to increase the sound-deadening property of the mat.

The base layer 5 is preferably prepared by milling about 20 to 30 parts by weight of scrap cellular polyurethane sheets with about 70 to 80 parts by weight of relatively thin polyvinyl chloride sheets which are plasticized with about 30 to 40 percent by weight of dioctyl phthalate. The mixture is sheeted out preferably into sheets of about 25 to 35 mils in thickness in order to obtain the best sound deadening and cushioning properties.

The top layer 6 of the mat is preferably made of a plasticized polyvinyl base composition and also plasticized to a flexible state as previously described. The amount of highly crosslinked nonplastic rubber, if present in the top layer at all, is relatively small. The top layer may be easily colored by suitable oxides or pigments so as to match or harmonize with the color of the car interior. Another feature of a top layer of a polyvinyl halide compound is that it may be provided with ribs or designs and also cleaned very easily.

Suitable compositions for the top layers are listed below:

| Ingredients | Parts by weight | |
| --- | --- | --- |
| | A | B |
| Polyvinyl chloride | 100 | 100 |
| Dioctyl phthalate | 30 | 25 |
| Dioctyl adipate | 10 | 10 |
| Paraplex G-62 (an epoxidized medium molecular weight polyester resin sold by Rohm and Haas) | 3 | |
| Paraplex G-53 (a high molecular weight polyester resin) | | 25 |
| Barium—cadmium stabilizer | 2 | 2 |
| Filler (calcium carbonate) | 15 | 20 |

Top layers such as formed from the above formulae, are preferably about 4 to 12 mils in thickness.

The central spongy layer 7 is preferably thicker than the top layer 6 and is preferably about ⅛ to ⅜ inches in thickness. The central layer is preferably formed from a foamed polyurethane rubber which is the reaction product of hydroxy terminated polyols such as polyesters or polyethers with an excess of an organic polyisocyanate compound having two reactive isocyanate groups and water. The polyesters and polyethers are preferably hydroxy terminated, have low acid numbers, and have molecular weights of from about 500 to 3000 or 4000 and have some triol to provide branch chains. Suitable polyesters are polyethylene and propylene adipates and polyethylene sebacates. Suitable polyethers are polyethylene glycol and polytetramethylene glycol preferably of 500 or 600 or more molecular weight. Suitable diisocyanate compounds are p, p'-diphenyl diisocyanato methane, 2,4-tolylene diisocyanate, and naphthalene 1,5-diisocyanate, etc. The cellular polyurethane foamed rubber is ordinarily made by reacting an organic diisocyanate and a polyester or polyether in a commercial foam machine by pumping the liquid polyester and diisocyanate at high pressures through into a mixing chamber having a discharge nozzle. A small amount of water is also introduced into the nozzle either as a stream or in admixture with the polyester so that it will react with the diisocyanate to form carbon dioxide gas which will foam the resultant product. A suitable foamed polyurethane rubber is also produced by dissolving or dispersing an easily liquefied gas such as difluoromonochloromethane into a suitable polyglycol and thereafter reacting the polyglycol with a diisocyanate, as for example, described in the copending application of Charles B. Frost, Serial No. 541,823 filed October 30, 1955, now abandoned, and assigned to the assignee of the present invention.

A solid crust ordinarily forms on the top surface of the resultant polyurethane foam because of the loss of $CO_2$ or other gas from the surface before the polyurethane is strong enough to hold the gas and thereby form a cellular material. Ordinarily the dense crust is cut off by suitable means such as a leather splitter and discarded as waste. I have found that the crust, when milled into fine particles, is an excellent plasticizer and deadener for the thermoplastic base layer 5.

As seen in FIGS. 1 and 2, the floor mat 1 is shaped with a hump 10 to fit over the transmission gear housing. The mat has a generally horizontal portion 11 which fits over the floor boards and an inclined portion 12 which extends from a bend 14 upwardly away from the floor boards and toward the dash board. The inclined portion 12 preferably has openings 15, 16, and 17 which are provided for brake, clutch and accelerator pedals. As best seen in FIG. 3, the openings are preferably formed by removing portions of the material of each layer and heat-sealing edges 18 of the plastic top layer and edges 19 of the plastic bottom layer together with edges 9 of the central layer preferably with the aid of high frequency dielectric stress or by any other suitable method. The outer peripheral edges of the mat are also preferably heat sealed by applying pressure and high frequency or other suitable heating until fusion of the components together takes place.

The floor mat 1 is preferably vacuum formed by a mold 20 which comprises a hollow container 24 formed by a metal molding plate 25, having a molding surface 26, side walls 27 and a bottom wall 28. The mat 1 may be formed according to the present invention by a clamping marginal portion 29 of a plastic sheet 30 in the mold by means of a continuous ring 31 which is clamped by means of L-shaped fingers 32 to the outer peripheral edges 35 of the molding plate surface 25 with bolts 36 and wing nuts 37. The plastic sheet which may be used to form the base layer 5 is heated to a heat softened state by heating means such as banks of infrared lamps 40 which may be lowered from a first position relatively far above the mold to a second position which is relatively close to the plastic sheet.

After the sheet is soft, a vacuum is produced in the hollow container 24 by evacuating air therefrom through a vacuum pipe 43 by vacuum pumping means not shown. The plastic sheet 30 is pulled down from a first position as shown by dot dash lines of FIG. 7 to a second position against the molding surface 26 by the force created by atmospheric pressure outside the hollow container 24 and reduced pressure inside the container. The movement of the plastic sheet is terminated by its conformation to the shape of the molding surface which also covers the small openings 44 of the perforated molding plate 25. The passage of air before the movement of the sheet is so terminated is through the openings 44 into a plurality of small tubular members 45 formed by brazing their flanges 46 against the underside of the metal molding plate 25.

Before and during application of the vacuum, the molding plate is preferably heated to maintain the plastic in the softened state by steam which enters the container through a steam inlet pipe 50. Metal braces 51 and 52 are used to prevent the container from buckling or warping during the application vacuum and heat to the container.

In accordance with the present invention, the plasticized thermoplastic sheet is held while heated against the heated molding surface 26 long enough so that it loses its tendency to retract to its original state once it has been cooled. After the sheet has been held against the molding surface for a sufficient time the plastic sheet and the mold plate are preferably cooled by cooling means such as a spray of water which is carried to the underside of the molding plate 25 by water spray head 55 which are fed by a water inlet pipe 56.

As best seen in FIG. 6 the bottom wall 28 of the hollow container is preferably slightly tilted wtih respect to the horizontal to facilitate the drainage of water from the bottom through the water drainage pipe 60.

Upon cooling to a solid non softened state, the plastic sheet is removed from the mold by unfastening the ring 31 and any excess material along the marginal edges of the sheet may be trimmed off.

In accordance with the present invention, the laminated floor mat may be made by vacuum forming the laminated article in one forming operation by heating both sides of the laminate to a heat-softened state. In some applications, especially where the polyvinyl plastic composition of the upper surface is compounded with a cross linked rubber or vulcanized compatible rubber powder, and where the conformation of the plastic sheet to the mold is very quickly accomplished, it may not be necessary to heat the surface of the mold before forming so that the plasticized thermoplastic material is maintained in its heat softened state long enough to lose its tendency to shrink back to its original state.

The forming of plasticized thermoplastic articles may also be accomplished by methods other than vacuum forming such as heating the plasticized material to its heat softened state and forcing it to conform with a mold surface by means of a rubber diaphragm which has previously been cured against the face of the mold so as to conform precisely or generally thereto.

The thermoplastic material or the mold itself may be heated by other suitable means such as high frequency heating so as to be permanently formed in accordance with this invention.

While the laminated article is preferably formed in one operation and held together by heat sealing its edges and openings, the layers may be cemented together by a suitable cement such as one containing an epoxy resin and then formed by vacuum forming or other suitable methods. The mat may also be made by forming each layer separately and cementing or heat sealing them together after the molding operation.

Thus I have found an economical process for making an easily color harmonized and easily cleaned floor mat which has improved cushioning and sound deadening properties, in which a means is provided to eliminate water soaking at the pedal openings and edges.

It is to be understood that in accordance with the patent statutes, the particular form of product shown and described and the particular procedure set forth are presented for purposes of explanation and illustration and that various modifications of said product and procedure can be made without departing from our invention.

Having described my invention, I claim:

1. A flexible laminated automobile floor mat having a central hump portion with integral generally horizontal portions on opposite sides of said hump portion and integral portions on opposite sides of said hump portion inclined upwardly from said horizontal portions, one of the inclined portions having pedal openings therein, said mat comprising a flexible heterogeneous polymeric energy-absorbing base layer of plasticized polyvinyl chloride which at room temperature will not readily retract from the shape in which it is formed at elevated temperatures, an intermediate cellular elastic polyurethane layer bonded to the top surface of the base layer and having a thickness several times the average thickness of the base layer, said intermediate layer having a thickness throughout its margin and throughout the margins of the pedal openings which is only a fraction of its thickness inwardly of said margins, and a flexible polyvinyl chloride upper layer bonded to the top surface of the intermediate layer and having a thickness less than that of the base layer.

2. An automobile floor mat as defined in claim 1 wherein the polyvinyl chloride of said base layer contains finely divided particles of a dense cellular polyurethane elastomer.

3. An automobile floor mat as defined in claim 1 wherein said base layer has a plurality of spaced and staggered slits therein and is formed by molding a generally flat sheet at an elevated temperature.

References Cited in the file of this patent

UNITED STATES PATENTS

| 1,924,635 | Buffington | Aug. 29, 1933 |
| 2,337,525 | Peik | Dec. 21, 1943 |
| 2,748,042 | Borgese | May 29, 1956 |
| 2,753,276 | Brochhagen et al. | July 3, 1956 |
| 2,753,642 | Sullivan | July 10, 1956 |
| 2,759,475 | Van Swaay | Aug. 21, 1956 |
| 2,762,784 | Foust et al. | Sept. 11, 1956 |
| 2,785,739 | McGregor et al. | Mar. 19, 1957 |
| 2,806,812 | Merz | Sept. 17, 1957 |
| 2,850,423 | Kramp et al. | Sept. 2, 1958 |

FOREIGN PATENTS

| 1,134,599 | France | Dec. 3, 1956 |
| 764,330 | Great Britain | Dec. 28, 1956 |